June 18, 1929.  S. S. HOWARD  1,717,687

CONCEALED ODOMETER

Filed Jan. 24, 1927

Inventor
Sumner S. Howard

By Blackmore, Spencer & Heil
Attorneys

Patented June 18, 1929.

1,717,687

UNITED STATES PATENT OFFICE.

SUMNER S. HOWARD, OF FLINT, MICHIGAN, ASSIGNOR TO A C SPARK PLUG COMPANY, OF FLINT, MICHIGAN, A COMPANY OF MICHIGAN.

CONCEALED ODOMETER.

Application filed January 24, 1927. Serial No. 163,163.

My invention relates to a device intended for use on speedometers such as are placed upon motor vehicles which are rented to people who drive the vehicle themselves at a certain charge per mile traveled.

Ordinarily such vehicles are equipped with hub odometers which keep a record of the miles traveled and which are not apt to be tampered with by the driver. The objection to this type of registering device is that due to its location it is very apt to be injured. It is therefore considered desirable to mount the registering device upon the instrument board.

An object of my invention is to provide means associated with the speedometer not only to conceal the registration of the odometer mileage from view but also to prevent removal of the speedometer from the instrument board so that it may be tampered with or reset.

Other objects and advantages will be disclosed in the specification and accompanying drawing, in which.

Figure 1:
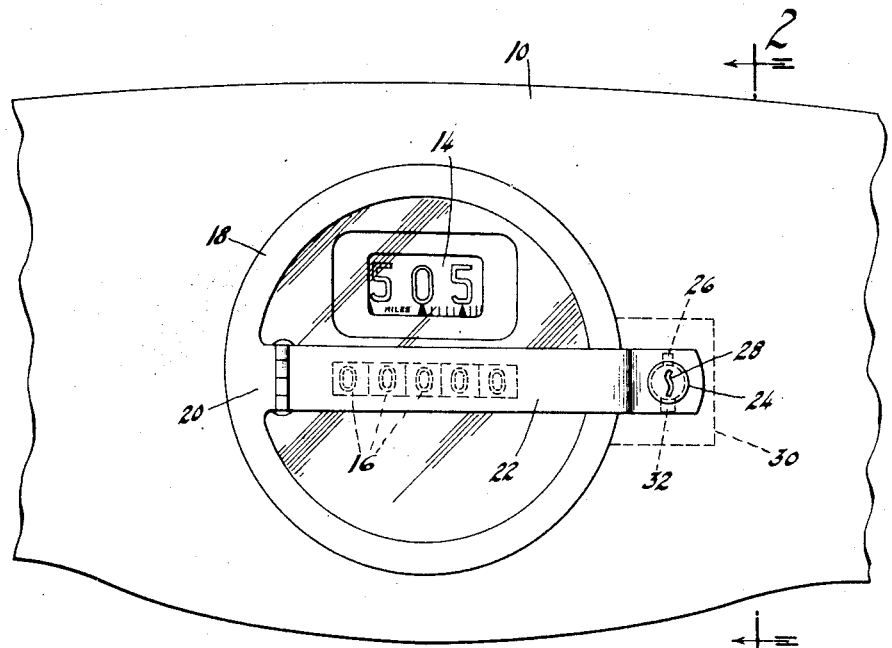
Figure 1 is a view looking at the face of an instrument board in which a speedometer having my improved locking and concealing device associated therewith, is shown.
Figure 2:
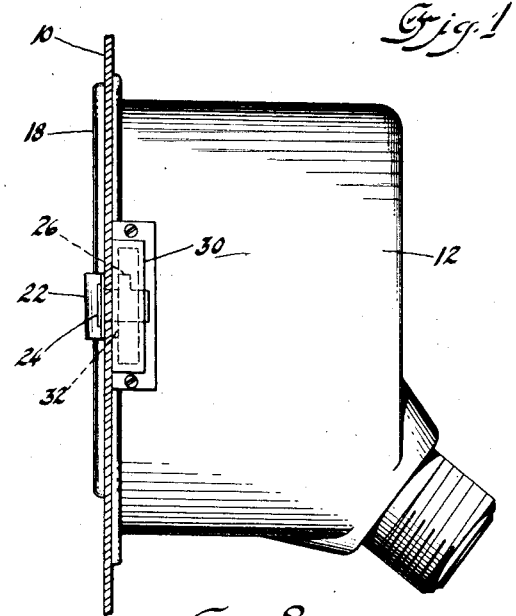
Figure 2 is a section taken on line 2—2 of Figure 1.

The numeral 10 indicates an instrument board in which is held a speedometer 12 by any of the usual clamping means. The speedometer is provided with the ordinary speed cup 14 for indicating the miles per hour and a series of odometer wheels 16 for measuring the number of miles traveled. A bezel 18 constituting a front cover for the speedometer projects through an opening in the instrument board. This bezel is provided with an extension 20 to which is hinged a plate 22. This plate has a rotatable cylinder lock member 24 journalled in it, the lock member being provided with a projection 26 and being adapted to be rotated only when a proper shaped key is inserted in the key hole 28. Secured to the side of the speedometer 12 is a small housing 30 having a round hole to receive the lock member 24 and a slot 32 to permit the entry of projection 26 when the latter is turned to the proper position.

It will be seen that after the plate 22 has been locked in position it will not only be impossible for the driver to observe the readings of the odometer mechanism but will also be impossible for him to remove the speedometer from the instrument board. The only indication that he should be interested in is the speed of the car and this is visible at all times.

The particular type of speedometer illustrated is not shown as having a reset stem but should one be provided, the driver would not be likely to attempt to reset the odometer mechanism because as he could not see it, he would not know whether he was turning it back or ahead.

It is thought from the foregoing taken in connection with the accompanying drawing that the construction and operation of the device will be apparent to those skilled in the art, and that various changes in size, shape, and proportions and details of construction may be made without departing from the spirit and scope of the appended claims.

I claim:

1. In combination with a speedometer having odometer mechanism, an instrument board having an opening in which the speedometer is held, a member pivotally connected to said speedometer, and locking mechanism co-operating with said member and said speedometer to secure said member in position to conceal the indications of said odometer mechanism and to prevent removal of said speedometer from said instrument board.

2. In combination with a speedometer having odometer mechanism, an instrument board having an opening in which the speedometer is held, a plate hinged to said speedometer, a lock member carried by the plate, and a housing secured to the speedometer, said lock member being adapted to engage said housing for the purpose of concealing the indications of said odometer mechanism and to prevent removal of said speedometer from said instrument board.

In testimony whereof I affix my signature.

SUMNER S. HOWARD.